Oct. 10, 1961    F. DORIS    3,003,535
TRACTION DEVICE FOR VEHICLE TIRE
Filed Aug. 16, 1960    2 Sheets-Sheet 1

INVENTOR.
Frank Doris
BY
Attorney

Oct. 10, 1961 F. DORIS 3,003,535
TRACTION DEVICE FOR VEHICLE TIRE
Filed Aug. 16, 1960 2 Sheets-Sheet 2
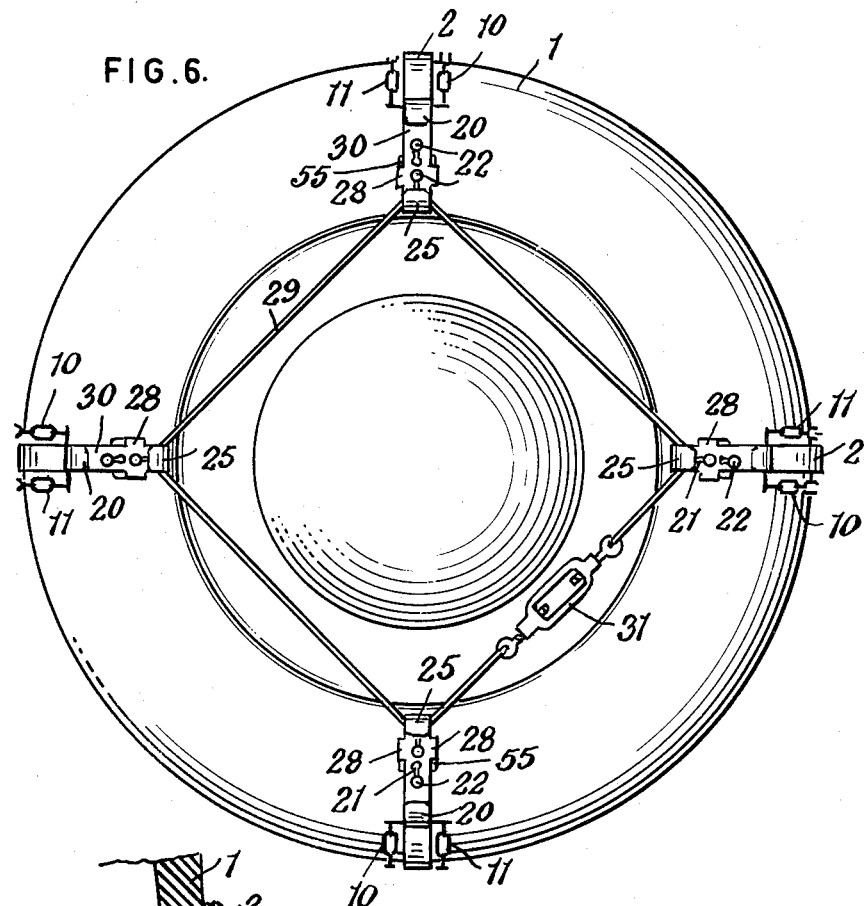
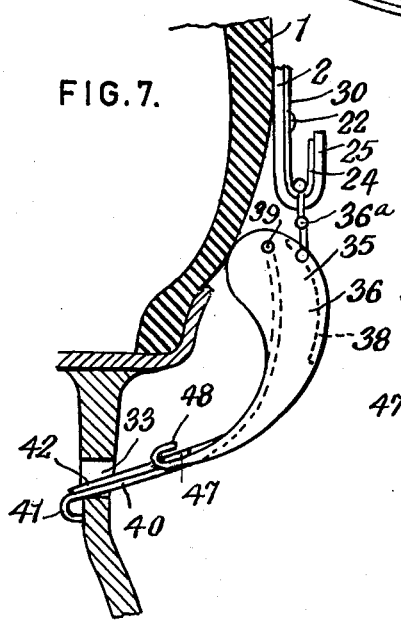
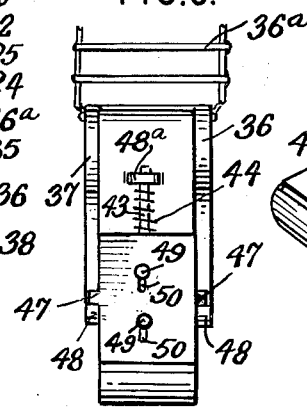
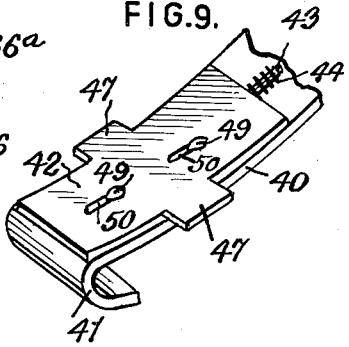
INVENTOR.
Frank Doris
BY
*Attorney*

3,003,535
TRACTION DEVICE FOR VEHICLE TIRE
Frank Doris, 3194 Perry Ave., Bronx, N.Y.
Filed Aug. 16, 1960, Ser. No. 50,030
9 Claims. (Cl. 152—223)

This invention relates to tire chains and particularly those adapted for attachment to the tires of automobiles for the purpose of improving traction, and especially on soft or slippery surfaces such as result from snow or ice.

It is an object of the invention to provide a device of this character which can be readily applied to and removed from a tire or vehicle wheel, even in deep snow, without the use of a jack or special tools which will be adjustable to enable it to be applied easily and properly to wheels of various sizes, and which, when fitted in position on the tire will retain its place thereon and provide the required traction during the rotation of the wheel.

It is an object of the invention to provide a device of this kind which will be adaptable to automobile wheels of different kinds; and which has other features of advantage apparent to those skilled in this art, especially the ease with which a worn chain can be replaced.

With these and other objects to be hereinafter set forth in view, I have devised the arrangement of parts to be set forth hereafter and more particularly pointed out in the claims appended hereto.

In the accompanying drawings, wherein an illustrative embodiment of the invention is disclosed.

FIG. 6 shows the device as applied to a tire;

FIG. 7 is a sectional view through a portion of a tire, showing how the device is attached to a wheel having slots;

FIG. 8 is a view of the parts shown in FIG. 7, as viewed from the left in FIG. 7, and FIG. 9 is a perspective view of the lower end portion of the structure shown in FIGS. 7 and 8.

Figure 1:
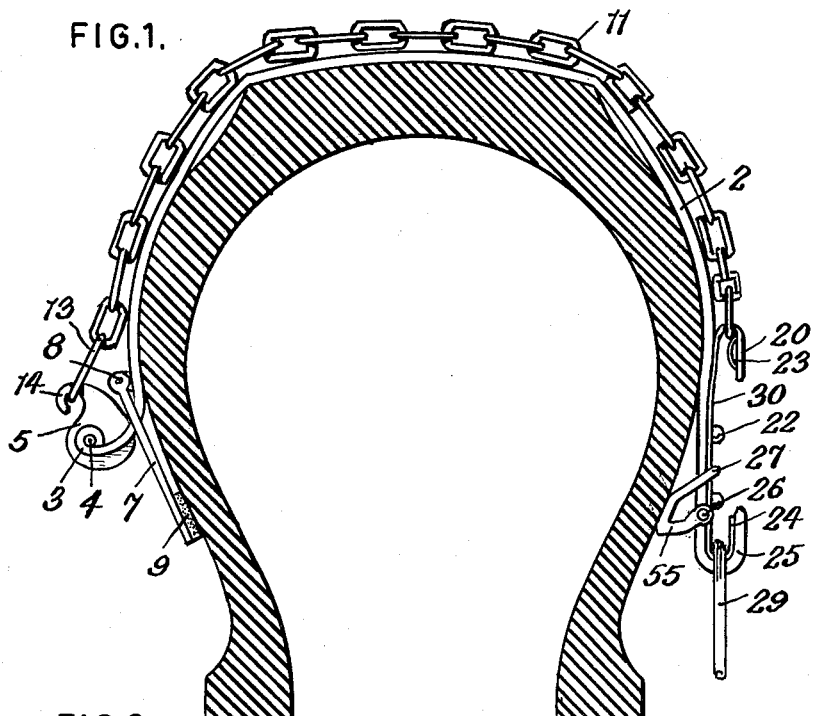
FIG. 1 is a sectional view through a tire showing the improved anti-skid device applied thereto.
Figure 2:
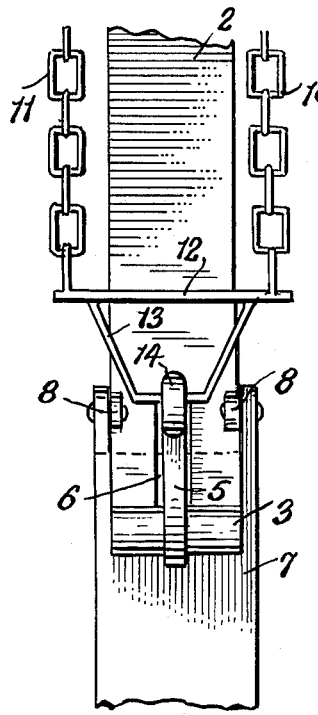
FIG. 2 is a front elevational view of one end of the device, or that shown at the left in FIG. 1.
Figure 3:
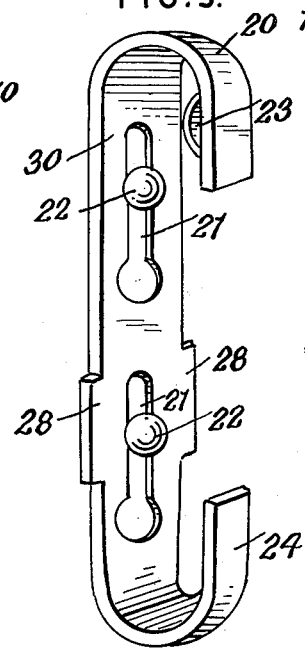
FIG. 3 is a perspective view of the hooked chain-attaching member located at the opposite end of the device.
Figure 4:
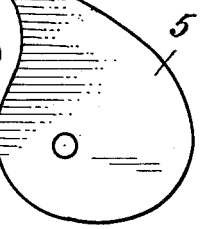
FIG. 4 is a face view of the clamping cam.

Referring to the drawing, and more particularly to FIGS. 1 to 4 inclusive, 1 indicates a tire of conventional form and to which the device has been applied. The device includes a substantially C-shaped strap member or saddle 2, which is preferably composed of metal and is shaped to generally conform to the curvature of the periphery of the tire across which it extends. At one end, the strap 2 is curled or rolled up to form a boss 3, receiving a pivot pin 4 on which a locking or clamping cam 5 is pivotally mounted. The C-shaped strap member 2 is formed with a slot shown at 6 in FIG. 2 through which a portion of the cam member 5 can be moved to enable it to act upon a pivoted plate 7. The plate 7 is pivoted at one end in lugs 8 provided on the strap 2 and is bifurcated at that end to enable the lower portion of the strap 2 to pass it. On one of its faces at its free end, the pivoted plate 7 is provided with a facing material 9 composed of reinforced rubber or tire material, adapted to bear against the face of the tire under the pressure of the cam member 5. This arrangement is such that by pivotal movement of the cam member 5, the plate 7 will be urged against the side of the tire and held thereagainst as long as the cam member remains in its proper clamping position.

Figure 5:
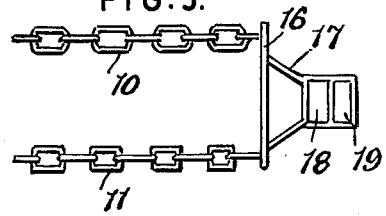
FIG. 5 shows one end of the chain.

The chain which extends across the periphery of the tire consists of two spaced stretches, shown respectively at 10 and 11, and at one end the stretches 10 and 11 are connected by a cross bar 12 on which is provided a loop portion 13 adapted to engage with a hook 14 provided on the cam member 5. A spring chain-retainer 15 is provided in the hook 14 to retain the loop 13 confined therein. The opposite end of the chain is shown in FIG. 5 and it will be therein noted that the two stretches 10 and 11 of the chain are connected by a cross bar 16 from which is extended a loop 17 divided into the sections 18 and 19 to provide for adjustability.

The latter end of the chain is adapted to be attached to a hook 20, formed on the end of an elongated plate 30, which plate is mounted for a limited slidable movement along the face of the strap 2. Such movement is permitted by means of two key-hole slots 21 formed in the plate 30 and engaged by studs or rivets 22 secured to the strap 2. Provided in the hook 20 is a chain-retaining spring 23. The sliding movement permitted to the plate 30 permits the plate to be fitted on the rivets 22 and then slid downwardly until its lower hook portion 24 engages behind a hook 25 formed on the lower end of the strap 2, substantially as shown in FIG. 1. Pivoted at 26 to the edges of the strap 2 near its lower hook 25 is a locking member 55, and in the position shown in FIG. 1 it engages against the side of the tire, while its arms 27 engage against lugs 28 extending laterally from the plate 30 and hold the plate against rising movement relatively to the strap 2.

In FIG. 6, four of the devices of FIG. 1 are shown as applied to a tire. It will be therein noted that a cable 29 extends between the four units and passes through the lower hooks 25 thereof. The cable is tensioned by means of a turnbuckle shown at 31 or by other suitable known tensioning means.

In the embodiment of the invention shown in FIGS. 7 to 9 inclusive, the device is shown as applied to a wheel having a plurality of spaced slots 33 provided in it. In this embodiment of the invention, a wheel-engaging device depends from the hooks 24 and 25 and engages with one of the openings 33 substantially as shown in FIG. 7. Such wheel-engaging device includes a pivotal cam or toggle member 35, connected to the hooks 24 and 25 by means of the flexible links 36. Said toggle member is provided with spaced side walls 36 and 37 connected by the rear wall 38.

Disposed between the walls 36 and 37 and pivotally connected at 39 to the same is a curved plate 40 which extends between the walls and has its free end terminating in a hook 41 which is extended through one of the openings 33 to engage against the inner side of the wheel, substantially as shown in FIG. 7. The cam or toggle member 35, when in its operative position, such as shown in FIG. 7, serves to hold the hook 41 in engagement with the wheel.

To maintain the cam or toggle member 35 in its tire-engaging position, a locking means is provided, such means consisting of a slidable plate 42 overlying a face of the plate 40 and having a restricted sliding movement relatively to the same. The locking plate 42 is provided at one end with a stem 43 surrounded by a coil spring 44 which has one end seated against the end of the plate 42 and its other end seated against a lug 48a provided on the face of the plate 40. This arrangement is such that the spring 44 biases the plate forwardly, or in a direction toward the hook 41, thus causing a pair of laterally-projecting lugs 47 provided on the locking plate 42 to be engaged by hooks 48 formed on the ends of the side walls 36 and 37 of the cam or toggle member 35. Sliding movement of the locking plate, as well as sidewise movement of the same is restricted by the rivets 49 and the slots 50 through which the rivets extend.

The structure of the device is such that the same may be readily fitted on a tire. In the embodiment shown in FIG. 1, the clamping engagement of the tire by the elements 7 and 25, and the use of the tensioning cable, retains the device securely in place. In the embodiment shown in FIG. 6, wherein the device is fitted to a slotted wheel, the engagement of the slots by the structure shown in FIGS. 7 to 9 is quick and easy and is obtaied by bringing the cam or toggle member down to its operative position shown in FIG. 7.

Having thus described a single embodiment of the invention, it is obvious that the same is not to be restricted thereto, but is broad enough to cover all structures coming within the scope of the annexed claims.

What I claim is:

1. A traction device for a vehicle wheel comprising, a hook-shaped strap fitting over the tread of a tire, a cam lever pivoted at one end of the strap, a chain extended across the tread of the tire and having one end attached to the cam lever, a loop on the opposite end of the chain, a plate on one end of which a hook is provided, said plate being slidably attached to the strap and having a hook on its opposite end, the strap having a hook-shaped terminal into which the last-mentioned hook is adapted to fit, a pivoted element carried by the strap and urged against the side of the tire by the action of the cam lever, and means engaging the plate to secure the device to a vehicle wheel.

2. A traction device as provided for in claim 1, including a cam lever engaging the hook-shaped terminal on the strap, and a locking plate connected to the cam lever, said locking plate having an end portion for engagement with an aperture in the wheel on which the tire is mounted.

3. A traction device for a vehicle wheel comprising, a hook-shaped strap member fitting transversely across the tread of a tire, a pair of chains extending across the tread and connected together at their ends, a cam lever pivoted at one end of the strap member, one end of the chains being connected to said cam lever, a radially outwardly turned end on the strap member remote from the cam lever, a plate slidably connected to the strap member, said plate having hooks at its opposite ends, one of which hooks is attached to the other end of the chains, the second hook being capable of fitment into the radially outwardly turned end on the strap when the cam lever is in a position of engagement with the side of the tire, and means engaging the last-mentioned hook and radially outwardly turned end of the strap member for holding the device on the tire.

4. A traction device for a vehicle tire comprising, a saddle adapted to embrace the periphery of a tire, said saddle having a pivoted cam member at one end and a hook member at its other end, a plate slidable on the last-mentioned end of the saddle, a chain connected at one end to the cam lever and at its other end to the plate, a clamping plate urged by the cam lever against the side of the tire, a locking lever pivotally connected to the end of the saddle remote from the cam lever, a wheel-engaging member on which the locking lever is pivoted, and a slidable latch on the wheel-engaging member for maintaining the locking lever in its locked position.

5. A traction device for a vehicle wheel comprising, a saddle adapted to embrace the periphery of a tire, a slotted hooked plate slidable at one end of the saddle, a chain having one end attached at a hook on the hooked plate, said chain extending across the periphery of the tire, the saddle having a cam lever pivotally mounted at its opposite end, a clamping plate pivotally mounted on the saddle and engaged by the cam lever and urged into contact with the side of the tire, a wheel-engaging member having a hook at one end for engagement with an aperture in the wheel on which the tire is mounted, said wheel-engaging member being flexibly connected to the hooked plate, a locking lever pivotally mounted on the wheel-engaging member and operative against the side of the tire, and a slidable latch on the wheel-engaging member for maintaining the locking lever in its locked position.

6. A traction device for a vehicle wheel comprising, a plurality of saddles positioned transversely of a tire, each saddle terminating in a hooked plate at one end, an adjustable cable extending between the hooks on the several saddles, a pivoted clamping plate at the opposite end of each of the saddles, a pivoted cam lever at said opposite end of each saddle, said cam lever being effective to urge the clamping plate into contact with the side of the tire, and chains extending across the tire and connected at one end to the cam lever and at the opposite end to the hooked plate.

7. A traction device for a vehicle tire as provided for in claim 6, wherein each of the saddles is in the form of a curved strap, the hooked plate being slidable on the strap, one end of the strap being radially outwardly turned to embrace a hook on the hooked plate.

8. A traction device for vehicle tires comprising, a saddle positioned transversely of a tire, the saddle having an adjustable hooked plate mounted at one end thereof, a chain having one end coupled to one of the hooks on the plate, a pivoted clamping plate at the opposite end of the saddle, a cam lever pivoted at said opposite end of the saddle and effective to urge the clamping plate against the side of the tire, the second end of the chain being attached to said cam lever, and means for securing the device to a vehicle tire.

9. A traction device as provided for in claim 8, further including a toggle coupled to the hooked plate and saddle and to the wheel on which the tire is mounted, said toggle including a pivoted locking lever operative against the side of the tire, and a latch for holding the locking lever in its locked position.

References Cited in the file of this patent

UNITED STATES PATENTS

| | | |
|---|---|---|
| 2,154,047 | Krider | Apr. 11, 1939 |
| 2,437,040 | Prevost et al. | Mar. 2, 1948 |
| 2,467,654 | Boje | Apr. 19, 1949 |
| 2,507,090 | Brown | May 9, 1950 |